(12) United States Patent
Hutton et al.

(10) Patent No.: US 7,233,905 B1
(45) Date of Patent: Jun. 19, 2007

(54) BILLING MODIFIER MODULE FOR INTEGRATED EMERGENCY MEDICAL TRANSPORTATION DATABASE SYSTEM

(75) Inventors: Kevin C. Hutton, Solana Beach, CA (US); Scott J. Jones, Escondido, CA (US)

(73) Assignee: Golden Hour Data Systems, Inc., San Diego, CA (US)

( * ) Notice: Subject to any disclaimer, the term of this patent is extended or adjusted under 35 U.S.C. 154(b) by 740 days.

(21) Appl. No.: 10/007,642

(22) Filed: Nov. 6, 2001

Related U.S. Application Data (60) Provisional application No. 60/246,263, filed on Nov. 6, 2000.

(51) Int. Cl.
*G06Q 10/00* (2006.01)
(52) U.S. Cl. .............................. 705/2; 705/3
(58) Field of Classification Search .................. 705/2, 705/3; 600/300; 707/104.1, 10
See application file for complete search history.

(56) References Cited

U.S. PATENT DOCUMENTS

| | | | |
|---|---|---|---|
| 1,873,126 | A | 8/1932 | Hugershoff |
| 2,977,177 | A | 3/1961 | McLaughlin et al. |
| 3,921,318 | A | 11/1975 | Calavetta |
| 4,221,404 | A | 9/1980 | Shuffstall |
| 4,236,332 | A | 12/1980 | Domo |
| 4,814,711 | A | 3/1989 | Olsen et al. |
| 4,819,053 | A | 4/1989 | Halavais |
| 4,858,121 | A * | 8/1989 | Barber et al. .................. 705/2 |
| 5,122,959 | A | 6/1992 | Nathanson et al. |
| 5,146,439 | A | 9/1992 | Jachmann et al. |
| 5,283,829 | A | 2/1994 | Anderson |
| 5,327,341 | A | 7/1994 | Whalen et al. |

(Continued)

FOREIGN PATENT DOCUMENTS

JP 01319861 A * 12/1989

OTHER PUBLICATIONS

Wyoming Medicaid Provider Manual Billing Manuals. Mar. 1, 1999. Section on HCFA 1500, chapters 4 (pp. 4-4, 4-7, and 4-54 in particular) and 9 (pp. 9-11 to 9-13). Section on Transportation, chapter 3 (3-12 to 3-22 in particular) and Appendices (C,D).*

(Continued)

*Primary Examiner*—Ella Colbert
*Assistant Examiner*—Martin A. Gottschalk
(74) *Attorney, Agent, or Firm*—Knobbe Martens Olson & Bear, LLP (57) ABSTRACT

An integrated medical database system for the emergency medical transportation business. The system includes a dispatch and demographic module, a clinical module, an administration module and a billing module. Each module may communicate data with one or more of the other modules to form a system incorporating data sharing, thus achieving an end-to-end automation of emergency medical care accounting. Internal consistency checks are performed by the system to ensure that proper treatments are performed according to a chosen diagnosis. The system includes a billing modifier module operating on data from the dispatch and demographic module. In one embodiment, the billing modifier module applies Geographic Practice Cost Index (GPCI) and Metropolitan Statistical Area (MSA) billing modifiers based on modifiable computerized rules so as to provide a more accurate charge to the payer. The results of the billing modifier module are forwarded to the billing module.

33 Claims, 3 Drawing Sheets

U.S. PATENT DOCUMENTS

| | | | |
|---|---|---|---|
| 5,465,206 A | 11/1995 | Hilt et al. | |
| 5,483,443 A | 1/1996 | Milstein et al. | |
| 5,508,912 A | 4/1996 | Schneiderman | |
| 5,544,044 A | 8/1996 | Leatherman | |
| 5,550,976 A | 8/1996 | Henderson et al. | |
| 5,619,991 A | 4/1997 | Sloane | |
| 5,874,897 A | 2/1999 | Klempau et al. | |
| 5,911,132 A | 6/1999 | Sloane | |
| 5,940,013 A | 8/1999 | Vladimir et al. | |
| 5,974,355 A | 10/1999 | Matsumoto et al. | |
| 6,029,144 A | 2/2000 | Barrett et al. | |
| 6,044,323 A | 3/2000 | Yee et al. | |
| 6,106,459 A * | 8/2000 | Clawson | 600/300 |
| 6,117,073 A | 9/2000 | Jones et al. | 600/300 |
| 6,151,581 A | 11/2000 | Kraftson et al. | |
| 6,438,533 B1 | 8/2002 | Spackman et al. | |
| 6,529,876 B1 | 3/2003 | Dart et al. | |
| 6,725,209 B1 | 4/2004 | Iliff | |
| 6,751,630 B1 | 6/2004 | Franks et al. | |
| 6,785,410 B2 | 8/2004 | Vining et al. | |
| 6,868,074 B1 | 3/2005 | Hanson | |
| 6,915,265 B1 | 7/2005 | Johnson | |
| 2002/0004729 A1 | 1/2002 | Zak et al. | |
| 2003/0093320 A1 * | 5/2003 | Sullivan | 705/19 |

OTHER PUBLICATIONS

Schriewer, "Airborne Ambulance Saves Precious Time," Tulsa World, May 22, 1996, pp. 1-2.

Hudson, "Attorneys Fear Patient Transfer Claims in Malpractice Cases," Hospitals, Apr. 5, 1991, vol. 65, issue 7, pp. 44-48.

Segroves, "Navigation systems aids medical flights Bad weather landings are now possible at hospitals," News Sentinel, Aug. 7, 1994, pp. D7-8.

Spencer, Thomas, "Contracting for helicopter emergency transport services," Healthcare Financial Management, Aug. 1993, pp. 67-72.

www.aeromed-software.com, Feb. 5, 1998.

Public Law 104-191, Health Insurance Portability and Accountability Act of 1996, published Aug. 21, 1996, located at <http://aspe.hhs.gov/admnsimp/pl 104191.htm>.

* cited by examiner

BILLING MODIFIER MODULE FOR INTEGRATED EMERGENCY MEDICAL TRANSPORTATION DATABASE SYSTEM

RELATED APPLICATIONS

This application claims priority to U.S. Provisional Application No. 60/246,263, filed Nov. 6, 2000 and titled "INTEGRATED EMERGENCY MEDICAL TRANSPORTATION DATABASE SYSTEM WITH APPLICATION OF BILLING MODIFIERS," which is hereby incorporated by reference in its entirety. This application is related to U.S. application Ser. No. 10/007,644 entitled "DATA ACCURACY FILTER FOR INTEGRATED EMERGENCY MEDICAL TRANSPORTATION DATABASE SYSTEM," filed on even date herewith, U.S. application Ser. No. 10/007,641 entitled "COMPLIANCE AUDIT FOR INTEGRATED EMERGENCY MEDICAL TRANSPORTATION DATABASE SYSTEM," filed on even date herewith, and U.S. application Ser. No. 10/012,884 entitled "INTEGRATED EMERGENCY MEDICAL TRANSPORTATION DATABASE AND VIRTUAL PRIVATE NETWORK SYSTEM," filed on even date herewith.

BACKGROUND OF THE INVENTION

1. Field of the Invention

This invention relates to an integrated medical database system. More specifically, this invention relates to a billing modifier module for a medical database in the emergency medical transportation industry.

2. Description of the Related Technology

Current documentation procedures in the medical transport industry are based on an inefficient paper and pencil technology. Important information is frequently collected on loose sheets of paper. In the environment of emergency medical transport, little time is available to neatly chart and document all pertinent and required information on a single document. Dispatch data, demographic data and clinical data are normally tracked as fragmented pieces of information that are later coalesced into a complete patient chart. In many cases, these data include the same information, thus forcing the input of redundant information. The resultant chart is therefore vulnerable to being incomplete and unreliable. In a medical setting, incomplete information can lead to disastrous clinical results.

This same technology is used to support industry quality improvement and billing procedures and submit letters of transport justification. This paperwork is usually carried out well after the date the patient is encountered, prolonging account receivable times in many instances to the point of compromising and jeopardizing service compensation. Inventory stocking and tracking is similarly a victim of extended turnover times and is often incomplete and inaccurate.

The fragmentation throughout the medical transport environment is also evident in the myriad of entities throughout the country practicing different standards of care and documentation. As is the case in other segments of the healthcare industry, even seemingly simple tasks of communicating among the various entities, as well as among sections of a single providing entity, is severely hampered by the lack of a common communication format. This is especially evident when certain aspects of the system (such as computerized clinical laboratory result displays) have been upgraded with a uniquely tailored computerized system, while the remaining functions are still performed in an archaic manner. While the upgraded system may be effective for one singular aspect, such as dispatching, lab reporting, or chart dictating, the remainder of the system does not improve its effectiveness due to the other archaic components.

Current federal reimbursement changes for medical transportation are directed to acknowledge rural transports as being more expensive to accomplish because of the distances involved and the lower volume of transports. Current methods of attaching these modifiers are labor intensive and error prone. In many cases they are just not done because of the difficulty in applying them. There are significant financial benefits to adding these modifiers correctly and there are significant compliance risks to adding them incorrectly. What is desired is a capability to consistently apply transport associated modifiers in a compliant fashion. Furthermore, a capability where billing modifiers are applied to transport information would enhance a medical database system and is therefore also needed. Such billing modifiers would allow rural providers a financial advantage to offset low volumes of work, for example.

SUMMARY OF CERTAIN INVENTIVE ASPECTS

One aspect of the present invention is an integrated emergency medical transportation database system having a billing modifier module, the system comprising a medical emergency database configured to store at least clinical encounter information, patient demographic data and transport information; and a billing modifier module, wherein the billing modifier module accesses a clinical encounter location stored in the medical emergency database and compares the clinical encounter location to a list of geographic areas, and wherein the result of the comparison is used to apply billing modifiers to the medical charges associated with the medical emergency.

Another aspect of the invention is a method of billing modification for an integrated emergency medical transportation database system, the method comprising collecting at least clinical encounter information, patient demographic data and transport information into a medical emergency database; accessing a clinical encounter location stored in the medical emergency database; and comparing the clinical encounter location to a list of geographic areas, wherein the result of the comparison is used to apply a billing modifier to the medical charges associated with the medical emergency.

DETAILED DESCRIPTION OF CERTAIN INVENTIVE EMBODIMENTS

The following detailed description presents a description of certain specific embodiments of the present invention. In this description, reference is made to the drawings wherein like parts are designated with like numerals throughout.

For convenience, the discussion of the invention is organized into the following principal sections: Introduction, Hardware Overview, Data Flow Between Modules, Description of Software Module, and Conclusion.

Introduction

In certain embodiments, the present invention relates to an object oriented, interactive, international, client-server service for the medical transport industry. The service may integrate all aspects of patient record documentation into a single complete electronic chart. A server computer provides chart database information access to multiple transport providers simultaneously by securely transmitting, storing and maintaining standardized patient data, for instance, using guidelines set forth by the Scrambling Standards Organization. Individual transport-providing entities, such as helicopter and ambulance companies, obtain coded access to this server via phone lines with a modem equipped personal computer. Security is maintained by assigning each entity a unique code or identifier. Integrated Services Digital Network (ISDN) lines, Digital Satellite Systems (DSS), dedicated trunk lines (T1, T3, etc.), cable modem, DSL, or digital wireless systems may also be used for communication.

Each crew member involved in the patient's chart documentation, i.e., dispatcher, flight nurse, paramedic and physician, as well as administrator and collector, possess coded access to chart portions relevant to their responsibilities and level of care provided. The chart is then electronically generated from the compendium of the information entered in a standardized fashion and in accordance with minimum industry documentation requirements and the inventory of financial health care standards. The system provides complete and accurate chart documentation and maintains internal consistency between each separate module. Furthermore, any sentinel events are automatically referred to the appropriate, responsible party. A sentinel event is any action during the encounter that might require a further review. Examples of sentinel events are scene times exceeding 40 minutes, nonsensical or inconsistent data entry by an emergency transport crew member, supply shortages for equipment not utilized or repeated claim denials.

Billing can be submitted electronically to the appropriate party in an appropriate format that reduces the accounts receivable times for each patient encounter. Letters of justification are automatically generated as well as follow up letters and utilization review reports. Inventory reports and lists of necessary base supplies and medicines are also electronically updated to appropriate supply centers and administrators. Customized and research reports can also be provided rapidly.

Data security and an automatic backup are provided. Although the chart data is normally made the property of the respective transport service provider, the system can retain non-proprietary data to provide industry benchmarking, quality assurance analysis and clinical research opportunities. Such standardized data collection and documentation will furthermore enable the development of an Emergency Medical Services data library to assist in the justification and legislation of governmental preventive policies for public safety.

Hardware Overview

Figure 1:
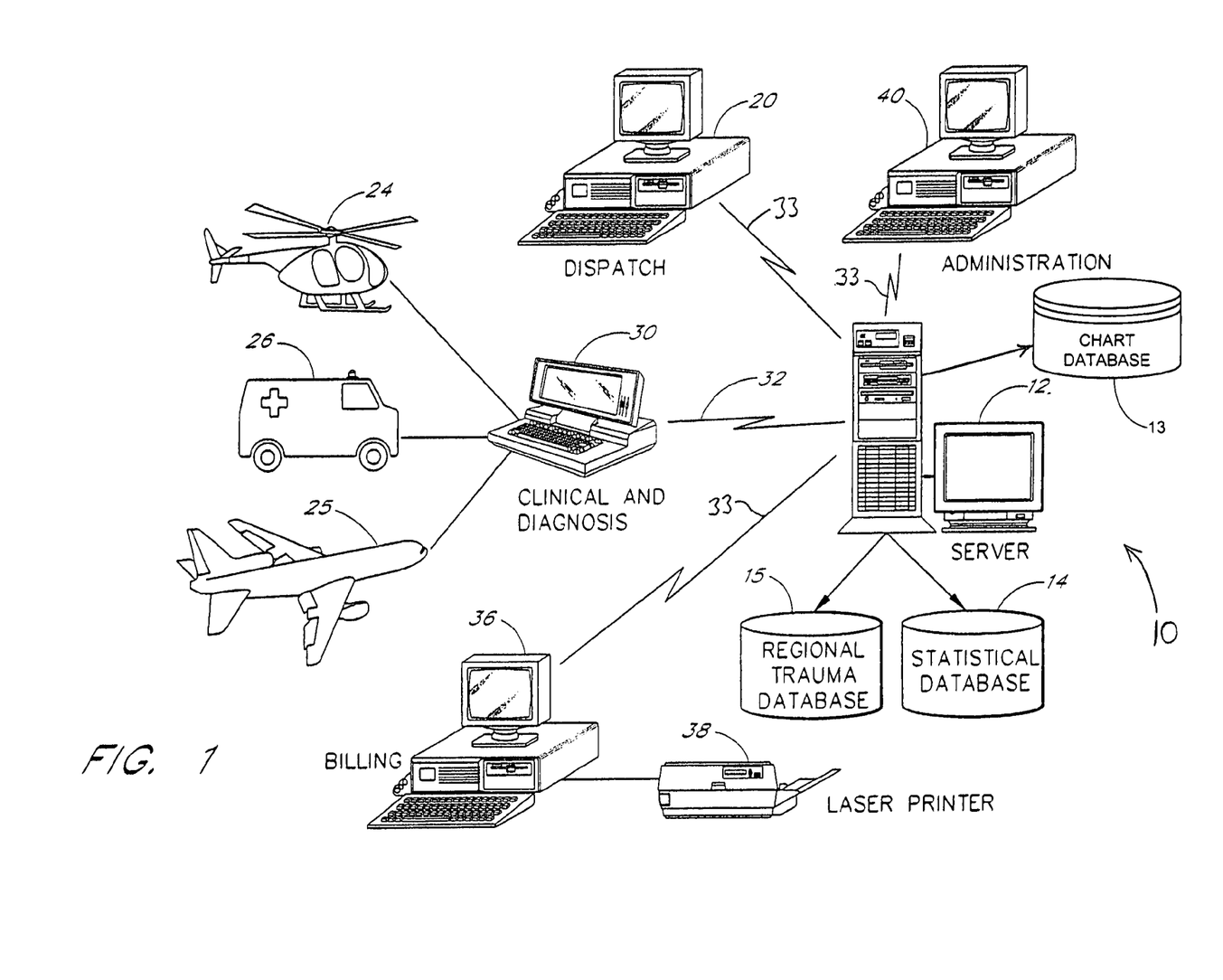
FIG. 1 is a diagram illustrating the on-line computing environment of one embodiment of the medical database system, including a dispatch interface computer, server computer, backup computer, clinical and diagnosis interface computer, administrative interface computer and billing interface computer.

FIG. 1 provides an overview of the computer hardware involved in one embodiment of the medical database system. In this embodiment, the medical database system 10 includes a server computer 12. The server computer 12 can be based on any well-known microprocessor such as those manufactured by Intel, Motorola, IBM or others. The server computer should be able to enable rapid simultaneous access to many users of the system. In one embodiment, the server computer 12 is an Intel Pentium III class computer having at least 256 Megabytes of RAM and a 10 gigabyte hard disk drive and a 500 MHz processing speed. Of course, many other standard or non-standard computers may support various embodiments of the medical database system 10.

The database application may be programmed in, for instance, ACIUS's 4th Dimension (4D) language and used in conjunction with the 4D Server and Client program. Also, another alternative computer environment is Microsoft Corporation's Visual Basic language with C++ middleware, and the BackOffice SQL Server program. It can therefore run in a standard Windows/Macintosh point-and-click office environment, and requires no additional, specialized software programming from the user. Of course, other standard or non-standard computer environments may support various embodiments of the medical database system 10.

As illustrated, the server computer can access a chart database 13. The chart database 13 stores the previously described electronic charts corresponding to patients that have utilized emergency medical transportation. The server computer can also access a statistical database 14 to store and extract statistical information from data entered during patient encounters. The collected statistics might include, for example, average scene and transport times, number of transport requests per demographic region and time of year, average number of advanced procedures performed by crew members and number of complications encountered. In addition, the database 14 can hold information relating to the average length of time to process claims by category and payment plan.

The server computer can also be linked to a regional trauma database 15. The database 15 holds information relating to local trauma centers, emergency medical practice and other local trauma-related information.

The dispatch module on the server computer 12 can be accessed via an interface to a dispatch computer 20, which might reside, for example, at the dispatch center that receives the initial call to deploy an emergency medical team. The dispatch computer 20 can provide just a communications interface to the server computer 12 so that it acts as computer terminal, or it can contain a portion of the dispatch module.

Based on the scene location and needs of the patient, the dispatch center might deploy a helicopter 24, airplane 25, ambulance 26, or other transportation mechanism. The dispatch computer 20 communicates with software for collecting information on the patient encounter and scheduling and deploying a crew to assist the injured patient. Within the medical database system 10, the helicopter 24, airplane 25 or ambulance 26 would include a portable computer or computing device 30 (note that the portable computer 30 may be any electronic device that includes computing capability) that is used by the emergency medical team during the patient encounter. A wireless connection 32 can be made by the portable computer 30 to the server computer 12 to update the database 14 after any data has been entered. In other embodiments, other ways of communication with the server 12 can be used. The portable computer 30 can include clinical and diagnosis modules to assist the emergency medical team in treating the injured patient, or can act as a terminal to communicate with these modules on the server computer 12. As will be explained below, the clinical and diagnosis modules can help the emergency medical team determine the proper diagnosis and treatment of the patient.

The medical database system 10 also includes a billing computer 36 in communication with the server computer 12. The billing computer 36 interfaces with the server computer 12 to run the billing module for tracking charges. The software billing module can be stored directly on the billing computer 36 or, alternatively, stored on the server 12 and accessed via the billing computer 36. The billing module is used to track charges, inventory, and medical equipment. In addition, it is used during the patient encounter for providing billing functions within the medical database system 10. The billing computer 36 communicates with a laser printer 38 to provide printed reports and bills to hospitals, patients and medical centers.

An administration computer 40 interfaces with the server computer 12 to provide run administrative reports. These reports might relate to the statistical information contained in the statistical database 14. In addition, the administration computer 40 might run reports that relate to payroll, inventory, flight training or many other administrative issues.

It should be noted that the dispatch interface computer 20, portable computer 30, billing computer 36 and administration computer 40 can communicate with the server computer 12 through a variety of mechanisms, as shown by connection paths 32 and 33. For example, a wireless LAN or cellular network may connect each computer with one another. In another embodiment, dedicated or dial-up phone lines can be used to communicate between the different computers. Communication mechanisms may include networks such as the Internet and may include virtual private networks (VPNs), which are further discussed in Applicant's copending patent application Ser. No. 10/012,884, entitled INTEGRATED EMERGENCY MEDICAL TRANSPORTATION DATABASE AND VIRTUAL PRIVATE NETWORK SYSTEM, and which is hereby incorporated by reference.

Data Flow Between Modules

Figure 2:
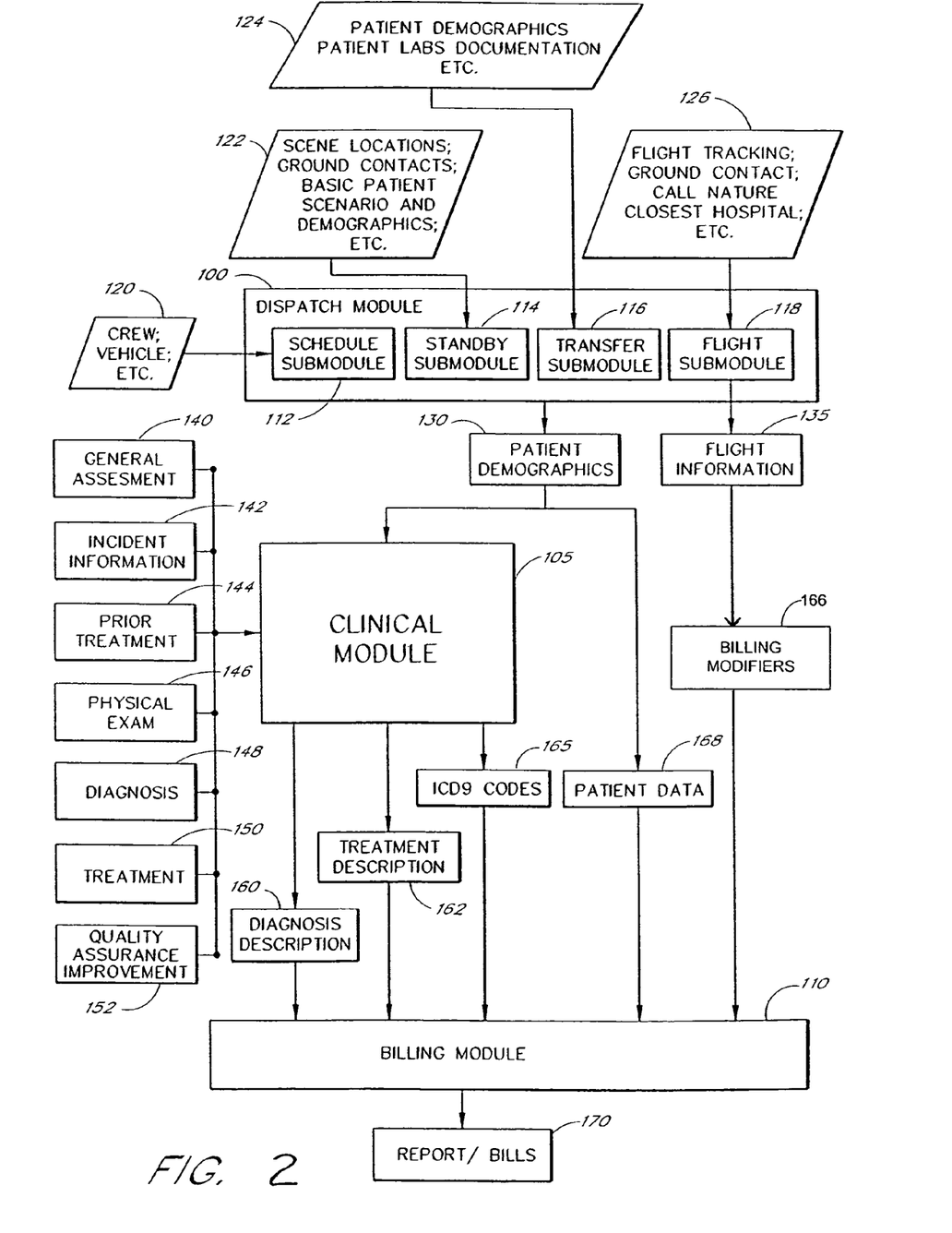
FIG. 2 is a block diagram illustrating one embodiment of the flow of data among a Dispatch module, a Clinical module, and a Billing module, in one embodiment of the medical database system.

Referring now to FIG. 2, a block diagram of one embodiment of the data flow between the various modules within the medical database system is illustrated. FIG. 2 illustrates the flow of data between a dispatch and demographic module 100 (hereafter referred to as the dispatch module), a clinical module 105 and a billing module 110. The dispatch module 100 includes a scheduling submodule 112, a standby submodule 114, a transfer submodule 116 and a flight submodule 118. These various submodules process information received into the overall dispatch module 100. For example, crew information 120 is processed within the schedule submodule 112. In addition, scene information 122 is processed within the standby submodule 114.

Patient demographics and patient lab information 124 is processed within the transfer submodule 116. Flight tracking and other transportation information 126 is processed within the flight submodule 118. Once the various submodules within the dispatch module 100 have processed their respective information, a set of patient demographic information 130 and flight/transport information 135 is made available to the remaining modules. For example, some of the patient demographic information 130 is imported into the clinical module 105.

In addition, many other pieces of data are placed within the clinical module 105. For example, the general assessment 140 of the patient that is taken by the emergency medical team is imported into the clinical module for further processing. In addition, other incident information 142 such as the type of incident (car accident, motorcycle accident, etc.) is sent to the clinical module 105. Prior treatment information 144 obtained from a physical exam of the patient or other information is also sent to the clinical module 105.

The prior treatment information might be important in determining whether the patient had already been treated for similar injuries thereby affecting the clinical diagnosis. Information collected from the physical exam 146 at the scene is also sent to the clinical module 105. In addition, any diagnosis 148 from the attending emergency medical team can be sent to the clinical module 105. It should be noted, as discussed below, that the medical database system 10 may also provide a diagnosis based on the physical exam information 146 and other information within the clinical module 105. This will be explained in more detail below.

Information relating to the treatment 150 of the patient is also sent to the clinical module 105. The medical database system 10 also includes a quality assurance database 152 which allows the emergency medical team to make suggestions or other comments that may be useful in additional treatments or incidents. For example, if the emergency medical team notes that a particular series of exam results has led to a unique diagnosis, this information can be input into the clinical module 105. Thus, the next time these same physical exam results are seen in a patient, the new diagnosis can be suggested to the emergency medical team.

Once the clinical module 105 has received its necessary information, data is output to the billing module 110. For example, a description of the diagnosis 160, a treatment description 162 or ICD-9 codes 165 can be sent from the clinical module 105 to the billing module 110. As is well known, ICD-9 codes are a set of unique codes referring to most well known medical procedures. These codes are used throughout the insurance industry to obtain payment for various medical procedures. In addition to the data from the clinical module 105, patient data 168 can be obtained from the patient demographic information 130. The flight/transport information 135 can be processed by a billing modifiers module 166. The processed data from the billing modifiers module 166 can be fed into the billing module 110. The billing modifiers module 166 will be described in conjunction with FIG. 3 below. The information received at the billing module 110 is then used within the billing module to generate reports and bills 170. As is to be expected, these reports and bills are sent to the various insurance companies and insurance providers. Thus, the medical database system 10 is an integrated system for providing many services within the medical industry. Further descriptions of the software modules are provided in Applicant's U.S. Pat. No. 6,117,073, which is hereby incorporated by reference.

Description of Software Module

The Billing Modifiers Module

Figure 3:
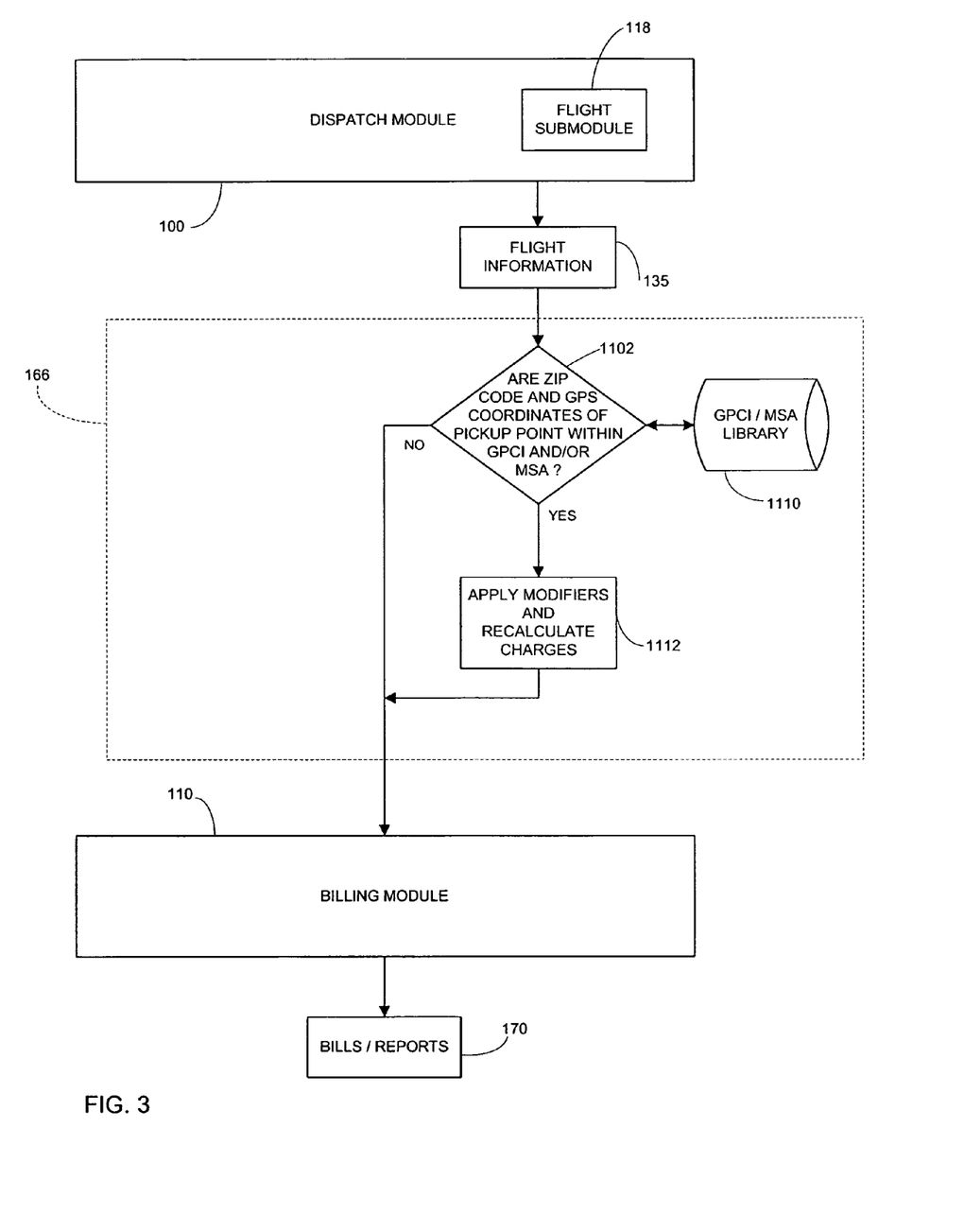
FIG. 3 is a flow diagram illustrating one embodiment of the Billing Modifier module process shown in FIG. 2.

Referring now to FIG. 3, a flow diagram illustrating one embodiment of the billing modifiers module process 166

(FIG. 2) is described. In one embodiment, prior to assembling data for production of a charge document, such as a bill, the billing modifiers module process 166 analyzes the patient pickup data including ZIP code, Global Positioning Satellite (GPS) coordinates, and latitude/longitude. The module 166 then applies Geographic Practice Cost Index (GPCI) and Metropolitan Statistical Area (MSA) billing modifiers appropriately—including the use of the Goldsmith correction factor of the MSA—and then adjusts the bill according to modifiable, computerized rules based on these modifiers. This provides for a more accurate charge to the payer. In one embodiment, the MSA and the GPCI are determined by the federal government and are distributed in non-proprietary datafiles.

As described above, specific transport information is collected at the dispatch and demographic module 100, such as by the transport (flight) submodule 118. In one embodiment, the collected transport data is screened for patient pick-up ZIP code and GPS data to generate the transport information 135. The transport information 135 can be forwarded to the billing modifiers module process 166.

In one embodiment, there are two billing modifiers: GPCI and MSA. These modifiers are multiplicative and increase the bill when they are applied. These modifiers are designed to allow rural providers a financial advantage to offset low volumes of work. The MSA is a yes/no answer (a MSA status of no means rural) and the GPCI is a number, such as, for example 0.933. Once the flight information 135 has been generated from the dispatch module 100, a determination is made at a decision state 1102 whether the ZIP code and global positioning satellite coordinates of the patient pick-up point are within a GPCI and/or a MSA.

This determination is made by linking the flight information 135 to a GPCI/MSA library 1110 that stores the ZIP codes, GPS coordinates and/or latitude/longitude of the GPCI and MSA areas along with the appropriate factor to be used to adjust bills within the designated area. Table 1 illustrates an exemplary portion of one embodiment of the library 1110.

TABLE 1

| COUNTY NAME | State | GPCI | MSA | ZIP CODE | GPS |
|---|---|---|---|---|---|
| AUTAUGA | AL | 0.872 | YES | 12910 | Lat/Lon |
| BALDWIN | AL | 0.872 | YES | 12911 | Lat/Lon |
| BARBOUR | AL | 0.872 | NO | 12912 | Lat/Lon |
| BIBB | AL | 0.872 | NO | 12913 | Lat/Lon |
| BLOUNT | AL | 0.872 | YES | 12914 | Lat/Lon |
| BULLOCK | AL | 0.872 | NO | 12915 | Lat/Lon |
| BUTLER | AL | 0.872 | NO | 12911 | Lat/Lon |
| CALHOUN | AL | 0.872 | YES | 12911 | Lat/Lon |

If a determination is made that the ZIP code is not within a GPCI or MSA area, the flight data 135 is forwarded directly to the billing module 110 without adjustment.

More specifically, at state 1102, the ZIP code and GPS coordinate data (converted to ZIP code in one embodiment) are evaluated and compared to the GPCI/MSA library 1110 so as to allow a modifier to be attached to the claim consistently. The GPCI is applied to every claim for the bill at this point as each ZIP code has a specific index. Note that all claims have an associated GPCI based on ZIP code. Pick-ups within an MSA are not eligible for this modifier unless they are acknowledged as appropriate for the Goldsmith correction. The Goldsmith correction is used in ZIP codes that are largely rural but have more than 50,000 people (definition of an MSA) in the ZIP code in one small area of the ZIP code. For example, a big city located in one corner of a ZIP code with a huge rural area would be eligible for Goldsmith correction.

However, if the ZIP code and/or GPS coordinates of the flight information are within a GPCI and/or MSA area, the correct fee modifiers are applied by state 1112 to recalculate the appropriate transport charges before forwarding them to the billing module 110. More particularly, if the pickup ZIP code and/or GPS coordinate indicates that the location is NOT in a MSA, then the modifier is applied. Once the MSA status (if applicable) and GPCI have been applied, the charges are recalculated with these modifiers.

As an example, a ZIP code 92075 is compared to the library 1110,

| COUNTY NAME | State | GPCI | MSA | ZIP CODE | GPS |
|---|---|---|---|---|---|
| San Diego | CA | 1.045 | YES | 92075 | Lat/Lon | the zip code library indicates the county as San Diego, yes it is an MSA, so no MSA modifier is applicable, GPCI is 1.045. The modifier for GPCI is applied and charges are calculated. In one embodiment, portions of the GPCI/MSA library 1110 are derived from a ZIP code file which contains all ZIP codes in the United States and identifies which are rural (non-MSA). This file includes those areas that fall into the Goldsmith modification. The ZIP codes determined as rural under the Goldsmith modification are listed as rural in the file. The ZIP code file may be downloaded from the former Health Care Financing Administration (HCFA) (now called the Center for Medicaid and Medicare (CMS)) mainframe (address is MU00.@AAA2390.ZIP.LOCALITY) into a modifiable library data file.

In one embodiment, an example of the processing at state 1112 follows:

GPCI $GPCI(X\%$ of the base rate)+the Base rate=the Modified Base rate

MSA the first X miles will be subject to a higher payment per mile when transport is from a non-MSA+ the standard payment for loaded mileage for the X-total miles X miles(base charge per mile+Y dollars per mile)+ Total miles−X(base charge per mile)

where:

X=the first number of loaded mileage allowed for modification

Y=the incremental increase in charge for the modified miles

Thus, prior to assembling data for entry into the billing module 110, the process 166 analyzes the patient pick up data, including ZIP code and GPS coordinates, to apply the proper MSA and GPCI billing modifiers. These modifiers preferably include the Goldsmith correction factor of the MSA. The billing modifiers module process 166 thus correctly adjusts the bill to properly charge for pick-ups within these particular areas.

At the completion of state 1112, or if the MSA modifiers do not need to be applied, as determined at decision state 1102, process 166 completes and then the record is released for billing review and bill preparation at the billing module 110. That is, if the data is not sufficient enough to apply modifiers, or has already recalculated with modifiers, the charges are forwarded to the billing module 110 and are placed directly on electronic or paper forms. The charges with modifiers and those not eligible for MSA status are tracked such that impact of the application of modifiers is reportable to demonstrate fiscal advantage of the modifiers at 170.

CONCLUSION

Specific blocks, sections, devices, functions and modules may have been set forth. However, a skilled technologist will realize that there are many ways to partition the system of the present invention, and that there are many parts, components, modules or functions that may be substituted for those listed above.

As should be appreciated by a skilled technologist, the processes that are undergone by the above described software may be arbitrarily redistributed to other modules, or combined together in a single module, or made available in a shareable dynamic link library. The software may be written in any programming language such as C, C++, BASIC or Visual BASIC, Pascal, Java, and FORTRAN and executed under a well-known operating system, such as variants of Windows, Macintosh, Unix, Linux, VxWorks, or other operating system. C, C++, BASIC or Visual BASIC, Pascal, Java, and FORTRAN are industry standard programming languages for which many commercial compilers can be used to create executable code. A database programming language such as ACIUS's 4th Dimension (4D) language used in conjunction with the 4D Server and Client program may also be used.

While the invention has been described in connection with specific embodiments thereof, it will be understood that it is capable of further modification, and this application is intended to cover any variations, uses, or adaptations of the invention following, in general, the principles of the invention and including such departures from the present invention as would be understood to those in the art as equivalent and the scope and context of the present invention is to be interpreted as including such equivalents and construed in accordance with the claims appended hereto.

What is claimed is:

1. An integrated emergency medical transportation database system having a billing modifier module, the system comprising:
    a medical emergency database configured to store at least clinical encounter information and transport information, wherein the transport information is associated with the clinical encounter information by at least including a location of a patient medical emergency; and
    a billing modifier module configured to access the clinical encounter location stored in the medical emergency database and configured to compare the clinical encounter location to a list of geographic areas, and further configured so that the result of the comparison is used to determine at least one billing modifier to be applied to the medical charges associated with the medical emergency.

2. The system of claim 1, wherein the list of geographic areas comprises a ZIP code list.

3. The system of claim 1, wherein the billing modifier is a plurality of billing modifiers and the billing modifiers are applied.

4. The system of claim 3, wherein the billing modifiers are multiplicative.

5. The system of claim 1, wherein the billing modifier is based on a metropolitan statistical area.

6. The system of claim 5, wherein the metropolitan statistical area is determined by the federal government.

7. The system of claim 1, wherein the billing modifier is based on a geographic practice cost index.

8. The system of claim 7, wherein the geographic practice cost index is determined by the federal government.

9. The system of claim 1, wherein the billing modifier provides rural transportation providers a financial advantage to offset low volumes of work.

10. The system of claim 1, additionally comprising a billing module in communication with the medical emergency database, the billing module receiving data from the billing modifier module.

11. A method of billing modification for an integrated emergency medical transportation database system, the method comprising:
    collecting at least clinical encounter information and transport information into a medical emergency database, wherein the transport information is associated with the clinical encounter information by at least including a location of a patient medical emergency;
    accessing the clinical encounter location stored in the medical emergency database;
    comparing the clinical encounter location to a list of geographic areas;
    determining a billing modifier based on the comparison; and
    applying the billing modifier to the medical charges associated with the medical emergency.

12. The method of claim 11, wherein the list of geographic areas is determined by the federal government.

13. The system of claim 1, wherein the clinical encounter information is indicative of medical transportation.

14. The method of claim 11, wherein the clinical encounter information is indicative of medical transportation.

15. The method of claim 11, wherein two or more billing modifiers are applied.

16. The method of claim 15, wherein the billing modifiers are multiplicative.

17. The method of claim 11, wherein the billing modifier is based on a metropolitan statistical area.

18. The method of claim 11, wherein the billing modifier is based on a geographic practice cost index.

19. The system of claim 1, wherein the clinical encounter location is a location remote from the location of the office of the patient's primary care physician.

20. The system of claim 1, wherein the billing modifier module is further configured to calculate one or more enhancement factors based on the clinical encounter location and to apply the one or more enhancement factors to the medical charges.

21. The system of claim 1, wherein the transport information comprises airborne emergency vehicle data.

22. The system of claim 1, wherein the transport information comprises patient pickup data used for purposes of billing.

23. The system of claim 1, wherein the location of the patient medical emergency includes geolocation coordinates.

24. The system of claim 1, wherein the comparison includes indexing into a geographic area with geolocation boundaries.

25. The system of claim 1, wherein the medical emergency database is associated with an emergency medical transportation entity.

26. The system of claim 1, wherein the determining is done via calculation.

27. The method of claim 11, wherein the clinical encounter location is a location remote from the location of the office of the patient's primary care physician.

28. The method of claim 11, wherein determining the billing modifier comprises calculating one or more enhancement factors based on the clinical encounter location.

29. The method of claim 28, wherein applying the billing modifier to the medical charges associated with the medical emergency comprises applying the one or more enhancement factors to the medical charges.

30. The method of claim 11, wherein the transport information comprises patient pickup data used for purposes of billing.

31. The method of claim 11, wherein the comparing includes indexing into a geographic area with geolocation boundaries.

32. The method of claim 11, wherein the medical emergency database is associated with an emergency medical transportation entity.

33. An integrated emergency medical transportation database system having a billing modifier module, the system comprising:

a medical emergency database configured to store at least clinical encounter information and transport information, wherein the transport information is associated with the clinical encounter information by at least including a location of a patient medical emergency; and a billing modifier module configured to access the clinical encounter location stored in the medical emergency database and configured to compare the clinical encounter location to a list of geographic areas, and further configured so that the result of the comparison is used to determine at least one enhancement factor to be applied to the medical charges associated with the medical emergency.

* * * * *